April 29, 1941.                M. MARTINKA                2,239,922
                         INTERNAL COMBUSTION ENGINE
                           Filed June 23, 1937              5 Sheets-Sheet 1

INVENTOR:
Michael MARTINKA
by
his Attorney

April 29, 1941. M. MARTINKA 2,239,922
INTERNAL COMBUSTION ENGINE
Filed June 23, 1937 5 Sheets-Sheet 2
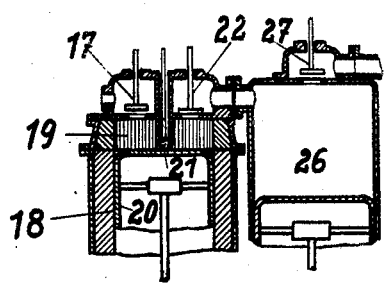
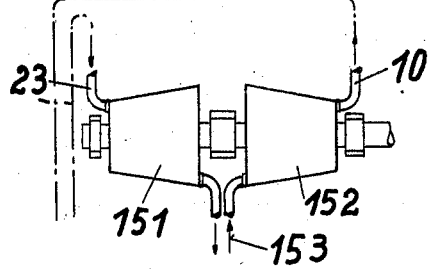
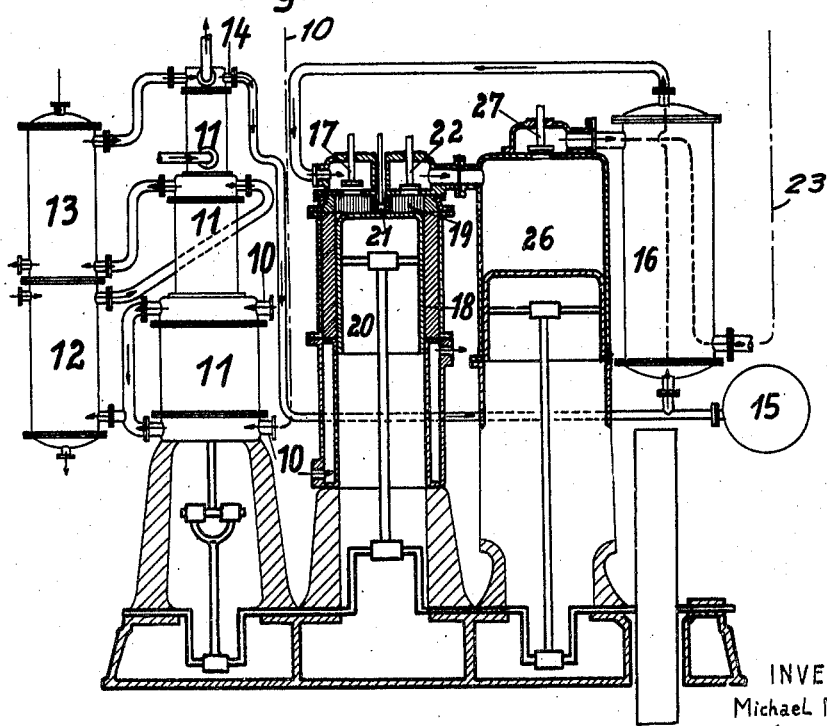
INVENTOR:
Michael MARTINKA
by *[signature]*
his Attorney April 29, 1941.  M. MARTINKA  2,239,922
INTERNAL COMBUSTION ENGINE
Filed June 23, 1937  5 Sheets-Sheet 3

INVENTOR:
Michael MARTINKA
by [signature]
his Attorney

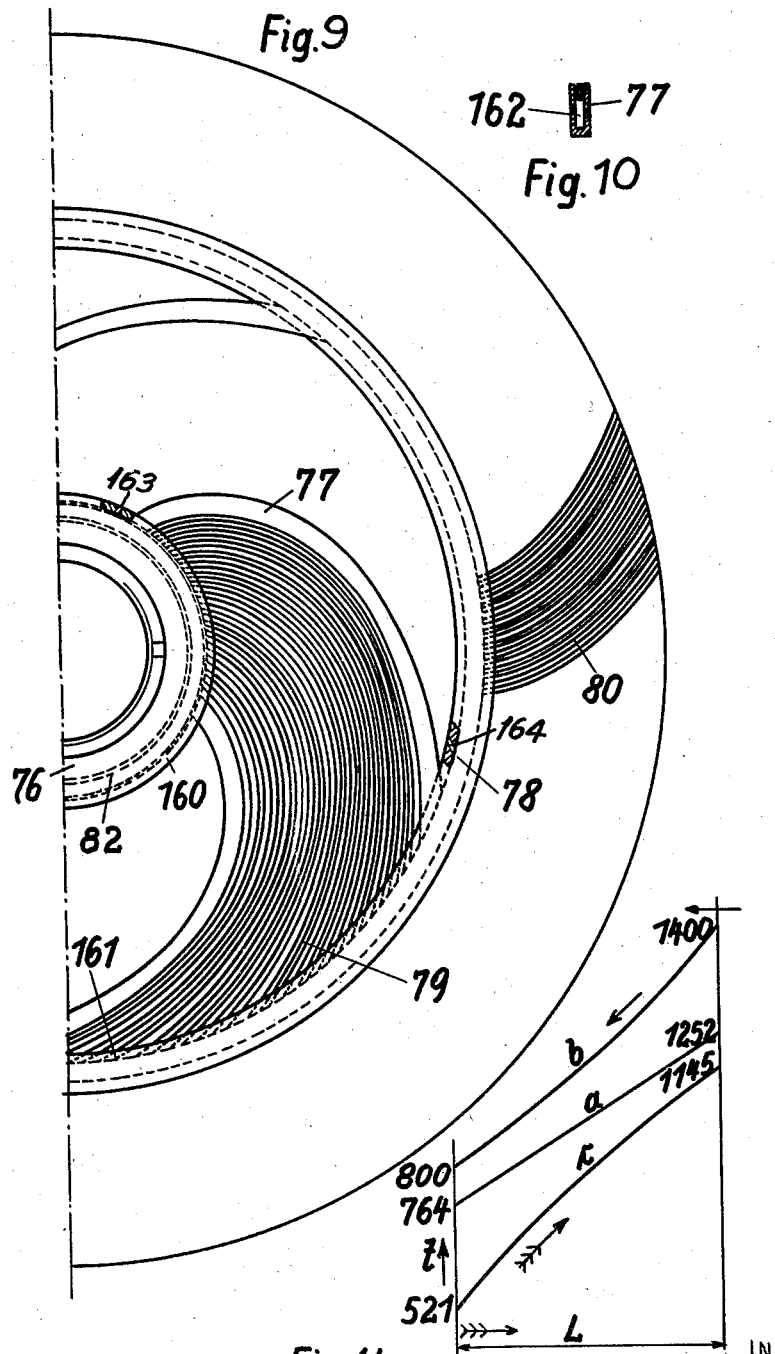

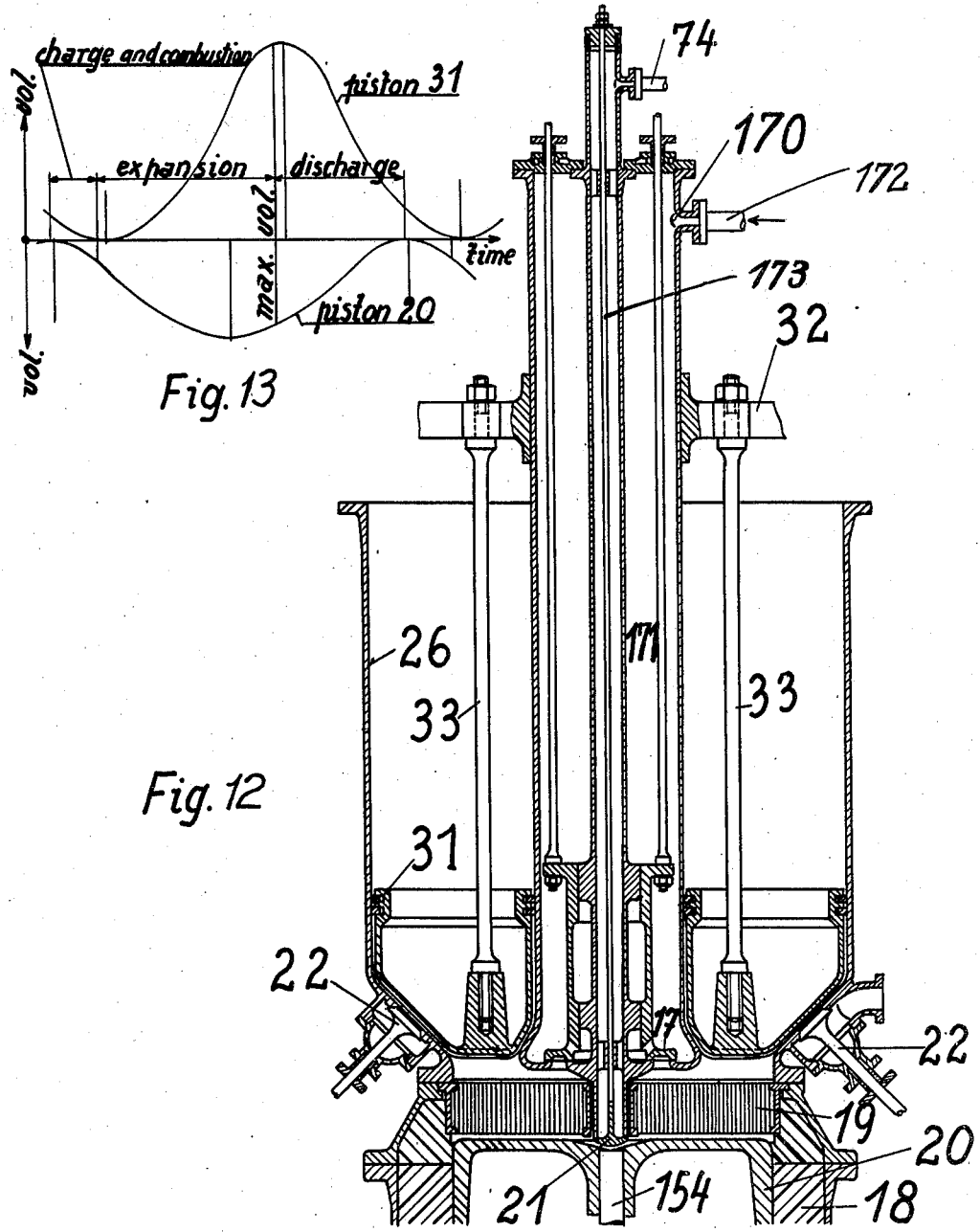

Patented Apr. 29, 1941

2,239,922

UNITED STATES PATENT OFFICE 2,239,922

INTERNAL COMBUSTION ENGINE

Michael Martinka, Duisburg, Germany

Application June 23, 1937, Serial No. 149,801
In Germany May 20, 1930

5 Claims. (Cl. 60—15)

My invention relates to internal combustion engines and more particularly to a plant for generating power by combustion heat and still more particularly to a plant comprising an internal combustion engine wherein the air of combustion and/or the gases of combustion are compressed in a compressor outside the combustion chamber, and wherein, on their way to the combustion chamber, these gases are heated by the exhaust gases of the combustion chamber.

It is one object of the invention to accomplish the working of such an engine in a simple manner and with a high degree of efficiency, and subjecting the inlet and exhaust valves to a small thermal strain only, and with a small clearance within the combustion cylinder. For this purpose—according to the invention—the gases are conducted in series through several heat exchangers, viz. through a high-temperature heat exchanger arranged in the combustion chamber and filling out as completely as possible the clearance above the working piston in its upper dead center position, and through a heat exchanger of lower temperature being situated outside of the combustion chamber.

It is a further object of the invention to direct or control the cycle of operations in such a manner that a very high efficiency is obtained, as well as a large output in proportion to the quantity of fuel used and to the size of the engine.

In the operation of the invention I prefer to compress the fresh air or gases in several stages, one part of which at least operates as nearly as possible according to an isothermal curve.

It is a further object of the present invention to adapt the heat exchangers, especially the high-temperature one, for the said particular purposes so as to enable it to withdraw efficiently the heat from the escaping gases and to supply it to the inflowing gases.

Figure 1:
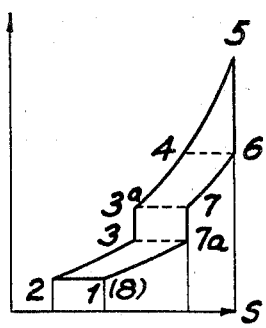
Figure 2:
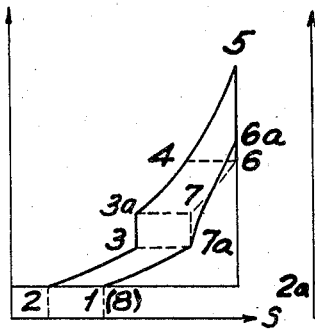
Figure 3:
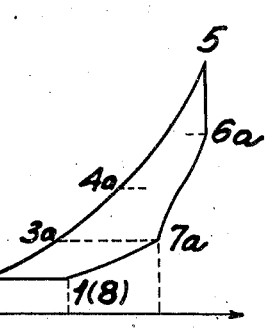
Figure 4:
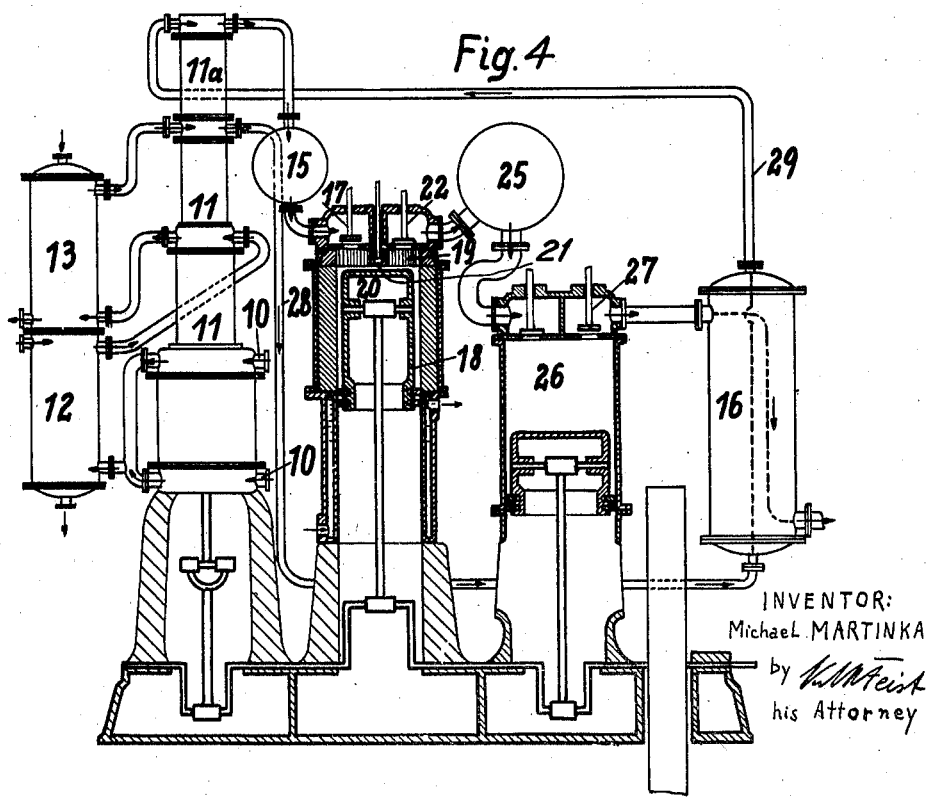
Figure 8:
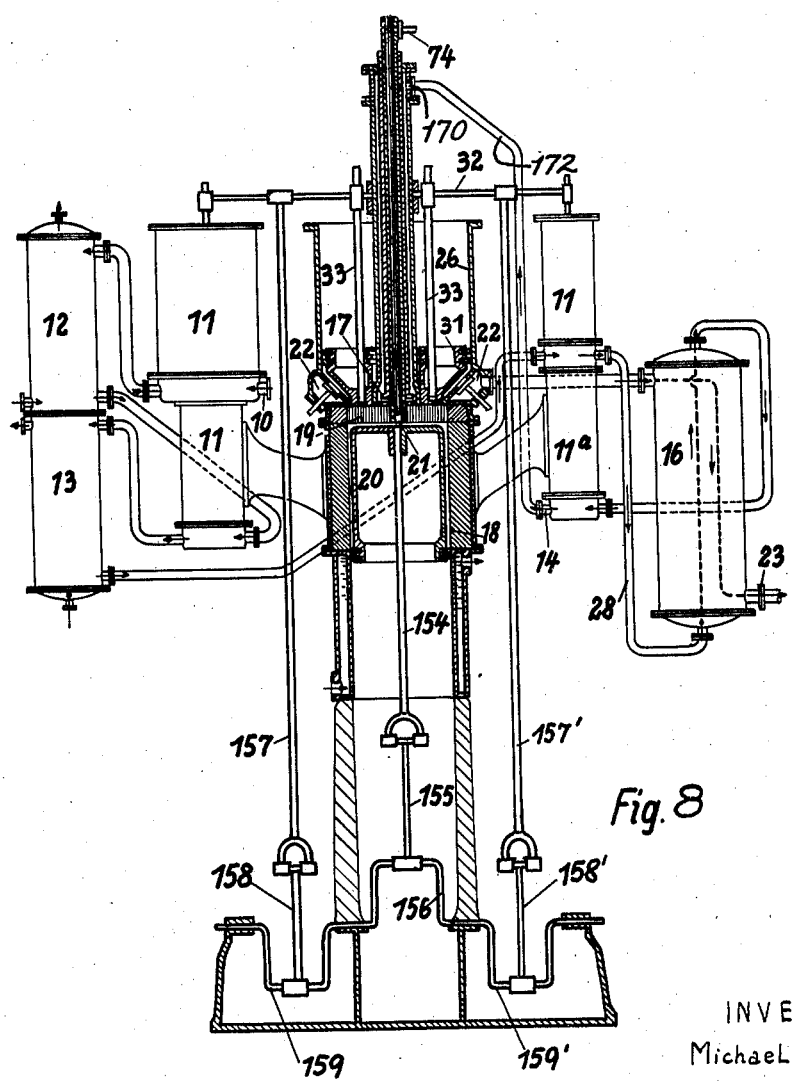

These and further details of the method according to the invention and of the engine and the installation by which the method may be accomplished, will appear in the following specification and accompanying drawings in which:

Fig. 1 is a temperature-entropy diagram (T-S diagram) illustrating a cycle for the operation of an embodiment of a plant according to the invention, said cycle showing partly adiabatic compression and expansion between the heat exchangers, Fig. 2 is a similar diagram illustrating a cycle for the operation of another embodiment of a plant, said cycle showing simultaneous expansion and cooling of the exhaust gases, Fig. 3 is a diagram of a cycle similar to that of Fig. 2, but showing only isothermal compression, Fig. 4 shows in a somewhat diagrammatical manner a plant operating in a cycle according to Fig. 1, said plant comprising an internal combustion engine with a high-pressure cylinder and a low-pressure cylinder, a high-temperature heat exchanger, a low-temperature heat exchanger and a compressor arranged between said two heat exchangers, some parts of the plant being shown in section, Fig. 5 is a fragmentary sectional view of the high-pressure cylinder and low-pressure cylinder of a different embodiment of a plant operating in a cycle according to Fig. 2, Fig. 6 shows a further embodiment of a plant operating in a cycle according to Fig. 3, Fig. 7 illustrates an embodiment of an expander and compressor for displacing the cycle into the range of a higher than atmospheric pressure, Fig. 8 illustrates an embodiment of a plant operating in a cycle according to Fig. 2 or 3, wherein the high-pressure cylinder and the low-pressure cylinder of the internal combustion engine are coaxially arranged, Fig. 9 is a fragmentary top plan view of a preferred embodiment of the high-temperature heat exchanger, Fig. 10 is a partial cross-section of Fig. 9, Fig. 11 is a diagram illustrating the temperatures prevailing within the high-temperature heat exchanger, Fig. 12 shows an enlarged sectional view of the upper portion of the internal combustion engine shown in Fig. 8, and Fig. 13 illustrates a diagram of the relations between the movements of the pistons and the volumes of the high-pressure cylinder and low-pressure cylinder of the plant shown in Figs. 8 and 12.

In the following specification the heat exchanger arranged in the combustion chamber is called the "high-temperature heat exchanger," and the heat exchanger outside the combustion chamber is called the "low-temperature heat exchanger."

In the diagrams illustrated in Figs. 1–3 the entropy S is the abscissa and the absolute temperature T is the ordinate. The diagrams show the cycles of engines having a combustion chamber being at the same time the working cylinder.

According to the diagram shown in Fig. 1, the fresh gases are isothermally compressed from point 1 to point 2 outside the working cylinder. From point 2 to point 3 the compressed air is heated in a low-temperature heat exchanger by the heat delivered by the exhaust gases. From point 3 to point 3a it is compressed adiabatically and from point 3a to point 4 it is further heated in a high-temperature heat exchanger, which is arranged within the combustion chamber and gives off the high temperature heat of the exhaust gases. From point 4 to point 5 the gases are heated by the internal combustion within the working cylinder under a constant pressure. From point 5 to point 6 the gases expand adiabatically in the high-pressure cylinder and deliver their heat to the high-temperature heat exchanger from point 6 to point 7, while they are discharged from the high-pressure cylinder into a receiver. Said receiver seems to compensate the quantity of the exhaust gases delivered by the high-pressure cylinder and the quantity of gases admitted into the low-pressure cylinder. From point 7 to point 7a the exhaust gases having a lower temperature are expanded adiabatically in said low-pressure cylinder, and from point 7a to point 8 coinciding with point 1 they deliver their heat in the low temperature exchanger. A plant operating in a cycle according to Fig. 1 will be described hereinafter in detail in connection with Fig. 4.

In the cycle according to Fig. 2, otherwise corresponding to the cycle according to Fig. 1, the solid line 6a—7a shows the development of temperature when the combustion gases pass without receiver through the high-temperature heat exchanger immediately into the low-pressure cylinder and expand there further. In this case, as explained more in detail in connection with Fig. 5, not only the receiver but also the inlet valves for the low-pressure cylinder may be omitted, thus simplifying the installation and reducing the losses of heat. Moreover, the pressure difference in the high-pressure cylinder becomes larger because the gases can partly pass immediately into the low-pressure cylinder.

On the line 6a to 7a of the diagram of Fig. 2 the pressure of the combustion gases is simultaneously reduced by expansion and by cooling in the high-temperature heat exchanger. In comparison to the dotted line 6—7 which corresponds to Fig. 1, the line 6a—7a creates equal areas on either side so that the area of the cycle has the same dimensions as that of the cycle according to Fig. 1.

Fig. 3 shows a cycle, according to which from point 1 to point 2a the fresh gases are isothermally compressed to the maximum pressure with which they are to be burned in the high-pressure cylinder. From point 2a to 3a the gases are heated in the low-temperature heat exchanger, from 3a to 4a in the high-temperature heat exchanger and then from 4a to 5 in the high-pressure cylinder by internal combustion under constant pressure. The line 5—6a—7a—8 corresponds to the same line in Fig. 2. A plant operating in the cycle according to Fig. 3 will be described in detail hereinafter in connection with Fig. 6.

The plant shown in Fig. 4 operates in the cycle shown in Fig. 1. The combustion air, which may have been filtered previously, passes at atmospheric pressure through the pipe 10 into the multi-stage compressor 11 provided with coolers 12 and 13 arranged in the path of the air between the first and second stage and between the second and third stage respectively. Thus, a substantially isothermal compression of the air is carried out in the compressor 11, whereupon the air is led through the pipe 28 into the low-temperature heat exchanger 16, in the state corresponding to point 2 of the diagram of Fig. 1. The air is heated in the low-temperature heat exchanger 16, by the exhaust gases flowing in the opposite direction, to the temperature corresponding to point 3 of the diagram shown in Fig. 1 and passes then through the conduit 29 into the cylinder 11a of the compressor 11. In said cylinder 11a the last stage of compression is carried out, and the air is adiabatically compressed to a state corresponding to point 3a of the diagram shown in Fig. 1. The compressed air discharged from the cylinder 11a is supplied to a receiver 15 through a suitable pipe connecting the cylinder 11a with the receiver 15. After leaving the receiver 15, the compressed air passes through the inlet valve 17 into the high-pressure cylinder 18 containing in its upper part the high-temperature heat exchanger 19 which fills out the clearance remaining above the piston 20 in its upper dead center position. Between the thin laminated sheets forming the high-temperature heat exchanger 19 the compressed air passes downwards from above, parallel to the axis of the high-pressure cylinder, hereby becoming heated to the temperature of point 4 in Fig. 1, while the piston moves downward.

The hot air leaving the high-temperature heat exchanger at its lower surface will be heated further by the fuel emerging from the injecting nozzle 21 and being burned in the highly heated air, under substantially constant pressure, to the temperature prevailing at point 5 of the diagram of Fig. 1. With the piston 20 moving further downwards the adiabatic expansion takes place whereby the temperature of the combustion gases drops from point 5 to point 6. In Fig. 1 illustrating the theoretical cycle, the temperature of point 4 is equal to the temperature of point 6, in practice, however, the temperature of the air at point 4 may be a few degrees lower than the temperature of the exhaust gases at point 6.

Now the exhaust valve 22 opens as soon as the piston 20 has reached its lower dead center position, and the now upward-moving piston discharges the burnt gases through the same channels between the laminated sheets of the high-temperature heat exchanger through which the incoming precompressed air passed before. In the high-temperature heat exchanger these exhaust gases give off their heat so that they attain the temperature of point 7 of the diagram shown in Fig. 1. The exhaust gases pass through the exhaust valve 22 into the receiver 25 connected with the low-pressure cylinder 26. The exhaust valve 22 of the high-pressure cylinder 18 opens the passage to the low-pressure cylinder 26 before the piston 20 reaches its lower dead center position. The crank of the low-pressure cylinder 26 lags behind that of the high-pressure cylinder 18 by an angle of about 120°-180°. The upward moving piston of the low-pressure cylinder 26 compresses the remaining gas contents of the low-pressure cylinder 26 to a pressure approximately equal to one prevailing in the high-pressure cylinder 18 when the outlet valve or exhaust valve 22 is opened. The desired amount of pressure is attained by closing the exhaust valve 27 of the low-pressure cylinder 26 sufficiently prematurely, before the piston of the low-pressure cylinder reaches its upper dead center position.

During the downward movement of the piston of the low-pressure cylinder 26, the exhaust gases are further expanded adiabatically to the point 7a of the diagram shown in Fig. 1. Then the exhaust gases are discharged through the opened valve 27 into the low-temperature heat exchanger 16 where they transfer their heat to the isothermally compressed air as described above, so that their temperature is reduced to the point 8 of the diagram shown in Fig. 1.

Fig. 5 shows a direct connection between the high-pressure cylinder 18 and the low-pressure cylinder 26 through the outlet valve 22 where, deviating from the arrangement of Fig. 4, the receiver 25 and the inlet valve of the low-pressure cylinder 26 are omitted. Said valve 22 serves at the same time as inlet valve for the low-pressure cylinder.

If the plant shown in Fig. 4 has the direct connection between the high-pressure cylinder 18 and the low-pressure cylinder 26 as shown in Fig. 5 permitting an immediate flow of the partly expanded combustion gases from the high-pressure cylinder into the low-pressure cylinder, the plant operates in the cycle illustrated in Fig. 2. The combustion gases will be discharged from the high-pressure cylinder as soon as the valve 22 opens, i. e. before the piston 20 has reached its lower dead center position. In this case the delivery of heat by the gases to the high-temperature heat exchanger and their further expansion in the low-pressure cylinder 26 takes place to a considerable extent simultaneously; hence the curved form of the line 6a—7a in the diagram of Fig. 2. As for the rest the mode of operation corresponds to that previously described in connection with Fig. 4.

Fig. 6 shows a plant operating in the cycle according to Fig. 3. The plant according to Fig. 6 has no compressor between the low-temperature heat exchanger 16 and the high-temperature heat exchanger 19. The fresh gases are compressed isothermally in the compressor 11. The receiver 15 is connected by way of a branch pipe to the pipe situated between the compressor branch piece 14 and the low-temperature heat exchanger 16, so that only the temporary differences between supply and consumption of compressed gases enter and leave the receiver. Otherwise the parts operate as previously described in connection with Figs. 4 and 5.

In order to work entirely under a higher than atmospheric pressure, the combustion gases, upon their emanating from the working cylinder 18 or the low-pressure cylinder 26, are not released into the free atmosphere but are further expanded for generating power. The set or group of machines for instance, as shown in Fig. 7 may serve that purpose. The dash and dot lines diagrammatically indicate a connection of said set with the plant according to Fig. 6. In this arrangement the combustion gases are completely expanded in the turbine 151 into which they enter coming either from the branch pipe 23 as shown in the drawings or from the low-pressure cylinder 26. The energy generated hereby drives the turbo-compressor 152 which sucks fresh air or gases through the branch piece 153 and conveys them in precompressed state to the branch piece 10 of the piston compressor 11.

A set of machines according to Fig. 7 may be provided before, or behind respectively, of any installations shown and described in the specification, so that each of the cycles may be operated within the sphere of higher than atmospheric pressure.

Fig. 8 illustrates a plant operating in the cycle according to Fig. 2 or 3, but where, deviating from the arrangement according to Figs. 4-6, the high-pressure and the low-pressure cylinders are coaxially arranged one above the other. Fig. 12 shows the upper portion of the device according to Fig. 8 in an enlarged scale. As is usual with such engines having countermoving pistons, the high-pressure piston 20 is connected to the crank shaft 156 by way of the piston rod 154 and the connecting rod 155. In deviation from the normal the connecting rod 155 is particularly small in proportion to the crank arm 156. While a proportion of 5:1 is usual, a ratio of about 2:1 has been chosen in the present case. The low-pressure piston 31 is connected with the transverse rod 32 by means of the rods 33 and it transmits its reciprocating movement to the cranks 159, 159' by way of the piston rods 157, 157' and connecting rods 158, 158'. The pistons of the compressors 11 and 11a are likewise driven directly by the transverse rod 32. The operation of the plant according to Fig. 8 is as follows:

The fresh air enters through the air inlet branch piece 10 into the three-stage compressor 11 which is provided with the inter-coolers 12 and 13. Then the compressed air is conducted through pipe 28 to the low-temperature heat exchanger 16 which it leaves again in heated state and is further compressed adiabatically in the compressor cylinder 11a. The now fully compressed air leaves the compressor 11a through the branch piece 14 and is led to the inlet 170 of the annular space 171 (Fig. 12) by means of the pipe 172 (Figs. 8 and 12). Then the compressed air passes the ring-shaped inlet valve 17 (Fig. 12) and, through the high-temperature heat exchanger 19, into the high-pressure cylinder 18, while the high-pressure piston 20 performs the first part of its downward stroke. During the downward stroke of the piston 20 the fuel, being supplied through pipe 74, enters into the cylinder 18 through the injection nozzle 21. While the piston 20 is thus gliding downwards, the low-pressure ring piston 31 has not quite reached yet its lower dead center position, but leaves a sufficiently wide space between it and the heat exchanger 19 for the distribution of the air which passes through the inlet valve 17 and must be distributed above the heat exchanger 19 across the entire area of the same. Only towards the end of the filling and combustion period the piston bottom of the low-pressure piston 31 approaches the surface of the heat exchanger 19; consequently, the clearance above the heat exchanger has a very slight volume only.

Inasmuch as, on account of the small length of the connecting rods 155 and 158 in proportion to the cranks 156 and 159, the low-pressure ring piston 31 has a very slow motion in the vicinity of its lower dead center position, piston 20 vice versa moves very rapidly in the vicinity of its upper dead center position, the effect of the cold part of the high-temperature heat exchanger acting as clearance, otherwise most detrimental, will be very small during the major part of the expansion in the high-pressure cylinder. This is even promoted by the fact that the stroke of the low-pressure ring piston 31 lags somewhat behind that of the high-pressure piston 20. The diagram of Fig. 13 illustrates said movements of the pistons and the volumes of the cylinders during a complete rotation of the shaft. As soon as the high-pressure piston has completed a considerable part of its stroke the low-pressure piston 31 too begins to travel upward with increasing velocity, while the motion of the high-pressure piston 20 slows down more and more. Consequently, the combustion gases expand further while a portion of them pass through the high-temperature heat exchanger 19 to the low-pressure cylinder 26 and deliver their heat to the high-temperature heat exchanger 19. The high-pressure piston 20 travels very slowly in the vicinity of its lower dead center position whereas the low-pressure piston 31 rapidly approaches its upper dead center position. A short time before it arrives at that point, the sum of the volumes of both cylinders has its maximum values. In this moment, or if the engine runs rapidly, a little earlier, the exhaust valves 22 open so that, during the subsequent reduction of the sum of the cylinder volumes, the combustion gases are displaced into the low-temperature heat exchanger 16. The exhaust valves 22 are kept open until the high-pressure piston 20 is at such a distance from the upper dead center position that the remaining part of the stroke up to the upper dead center position is sufficient for again compressing the remainder of the cylinder volume to the starting pressure, whereupon the operation begins anew from the upper dead center position of piston 20. The combustion gases discharged by the working cylinders pass the heat exchanger 16 and leave it through the branch piece 23 and reach the open air, just as in the case of the engines according to Figs. 5 and 6. The above mentioned relations between the movements of the pistons and the volumes of the high- and low-pressure cylinders are clearly indicated in the diagram of Fig. 13.

Fig. 9 shows a top plan view of the high-temperature heat exchanger. It consists of a frame at whose inner ring 76 spokes 77, curved in the form of involutes, are attached, and of an outer ring 78. To this ring 78 there is attached an inner row of laminated metal sheets 79 and an outer row of similar metal sheets 80, likewise curved in the form of involutes and held between the rings 76 and 78 and the spokes 77. The metal sheets 79 are held in the frame in that the outside of the ring 76 and the inner side of the ring 78 have projecting rims 160 and 161. Into these the ends of the sheets 79 may be inserted at any place through narrow slots arranged in said rims. For example, 163 and 164 indicate such slots. These narrow slots are suitably cut in by sawing and may be closed by welding after insertion of the sheets. Quite similarly, also the sheets 80 which are likewise curved in the form of involutes and are held by dovetails at the outer rim of the ring 78, may be inserted into the dovetailed groove through a slot provided at any point of the circumference. The distance of the metal sheets from one another being very small (e. g.: 0.1 mm=$\frac{1}{250}$") is secured by intermediate layers or liners of the same slight thickness in a similar manner as it is practised with the blades of a steam turbine wheel. At the outer ends of the sheets 80 a ring may be provided which is welded together after being put around. For the sake of clearness, the sheets or blades 79 and 80 are shown only in a part of the high-temperature heat exchanger, but it is well understood, that said blades extend entirely around the high-temperature heat exchanger.

For the cooling of the frame, channels are provided in the various parts which open towards the cooler part of the high-temperature heat exchangers, i. e. towards that side which is turned away from the combustion chamber. A channel of that kind is shown in the ring 76 as example, bearing reference mark 82.

Fig. 10 shows a transverse section through a spoke 77 possessing a hollow channel 162 which opens by means of holes towards the cooler part of the high-temperature heat exchanger.

The channels have the effect that, while the exhaust gases are being discharged, the low pressure prevailing at that time will also appear in them. As soon as the exhaust valve is then closed and the fresh gases begin to enter having a comparatively low temperature but a high pressure, the channels are filled by these gases, whereas the pressure in them increases to that of the entering gases. At the same time the gases entering the channels withdraw heat from the metal walls. Now, as soon as the pressure in the combustion cylinder decreases during the expansion, and especially during the discharge, the air leaves the narrow channels by expanding adiabatically. By this adiabatic expansion of the air remaining in the channels the gases are considerably cooled and consequently the same applies to the metal parts in contact with the gases. This cooling may be supplemented at the ring 76 by suitable means (not shown).

In those cases where the high-temperature heat exchanger is passed by exhaust gases which subsequently deliver further heat by expansion or in the low-temperature heat exchanger, while the inflowing air or gases are heated successively in the low-temperature and in the high-temperature heat exchanger, the proportion of the thickness of the sheets to the length of the way along which the gases flow alongside the sheets in such, to create a sufficient difference in temperature between the temperature of the inflowing gases and that temperature which is still permissible for the sheet metal. This will be understood more clearly, when the diagram of Fig. 11 is now described.

In this diagram (Fig. 11) the temperatures $t$ are the ordinates and the length L of the metal sheets in the direction of the gas current the abscissa. Between the sheets the heated combustion gases coming from the combustion cylinder pass along in the direction of the simple arrow (from right to left) whereas the gases to be heated flow in the direction of the multi-feathered arrow (from left to right). The line $a$ shows the distribution of temperature within the sheets. The line $b$ shows the mean temperature of the exhaust gases decreasing from right to left, and the line $c$ shows the mean temperature of the fresh gases increasing from left to right. The conductivity for heat of the metal of the sheets causes the more uniform distribution of temperature, to be gathered from line $a$, where the edges of the sheets, first hit by the discharged hot exhaust gases, cannot be endangered by them. It is, therefore, important that the sheets are not subdivided in the direction of the gas current, and that they consist of a material possessing a good conductivity for heat, allowing operating with high temperatures in the heat exchanger without destroying the material of the sheets. The possibility of applying high temperatures allows also to obtain small dimensions of the high-temperature heat exchanger and, consequently, a small clearance.

Between the inlet valves and the high-temperature heat exchanger a certain distance is provided in order to distribute the inflowing gases uniformly across the surface of the heat exchanger. This distance by which the high-temperature heat exchanger is to be displaced from the cylinder cover may be kept smaller if several inlet valves are employed. For the same reason I prefer employing several exhaust valves too.

What I claim is:

1. Internal combustion engine and installations comprising a multi-stage compressor, having intercoolers, a working cylinder in which the gases are heated by internal combustion and are expanded, an internal heat exchanger based on the principle of regeneration, arranged in the interior of said working cylinder, filling up the clearance above the piston bottom in the upper dead center position of the piston and external heat exchangers outside of the cylinder pipes conducting the fresh gases from the lower stage of the compressor to said external heat exchanger and other pipes reconducting the fresh gases heated in said external heat exchanger to upper stages of the compressor, and pipes conducting the fresh gases from the last stage of the compressor to the inlet valve of the combustion cylinder and through the regenerator, further pipes conducting the exhaust gases to the external heat exchanger after said exhaust gases have passed the regenerator.

2. Internal combustion engine and installation comprising a multi-stage compressor having intercoolers, a high-pressure working cylinder wherein the gases are heated by internal combustion and are partly expanded, an internal heat exchanger based on the principle of regeneration, said internal heat exchanger being arranged in the interior of said working cylinder to fill out the clearance above the piston in the upper dead center position thereof, an external heat exchanger outside said working cylinder, pipes conducting the fresh gases from the compressor through the external heat exchanger, inlet valves leading to the working cylinder and through the regenerator, and exhaust pipes conducting the exhaust gases to the external heat exchanger after said exhaust gases have passed the regenerator, said exhaust pipes leading from said high-pressure working cylinder directly to a low-pressure cylinder for further expansion of the exhaust gases, without intermediate receiver and inlet valves in said low-pressure cylinder, and leading from said low-pressure cylinder to the external heat exchanger, and the crank of said low-pressure cylinder lagging behind the crank of said high-pressure cylinder by an angle of more than 119° and less than 181°.

3. A plant comprising: an internal combustion engine having a high-pressure cylinder and a low-pressure cylinder, a multi-stage compressor provided with intercoolers and adapted to be driven by said internal combustion engine for the production of compressed air to be introduced into the combustion chamber of the high-pressure cylinder of said internal combustion engine, a high-temperature-heat-exchanger provided with channels, said high-temperature-heat-exchanger being arranged inside said cylinder to fill out the clearance above the piston in the upper dead center position thereof, a low-temperature-heat-exchanger arranged outside said cylinder, a conveying system for leading the precompressed air from the compressor into the combustion chamber of the cylinder, said low-temperature-heat-exchanger and said channels of the high-temperature-heat-exchanger being arranged in series in said conveying system, the low-temperature-heat-exchanger being the first one in said series, conveying means connecting said high-pressure cylinder with said low-pressure cylinder to lead the exhaust gases discharged through said channels of said high-temperature-heat-exchanger into said low-pressure cylinder for further expansion therein without internal combustion, and a line connecting said low-pressure cylinder with said low-temperature-heat-exchanger for the introduction of said exhaust gases into said low-temperature-heat-exchanger.

4. A plant comprising: an internal combustion engine, said internal combustion engine, said internal combustion engine having a high-pressure cylinder and a low-pressure cylinder, a multi-stage compressor provided with intercoolers and adapted to be driven by said internal combustion engine for the production of compressed air to be introduced into the high-pressure cylinder of said internal combustion engine, a high-temperature-heat-exchanger provided with channels, said high-temperature-heat-exchanger being arranged inside said high-pressure cylinder to fill out the clearance above the piston in the upper dead center position thereof, a low-temperature-heat-exchanger arranged outside said high-pressure cylinder, a pipe connecting said multi-stage compressor with said low-temperature-heat-exchanger to introduce the compressed air into said low-temperature-heat-exchanger for the first stage regeneration of the air in same, a line connecting said low-temperature-heat-exchanger with said high-pressure cylinder to lead the compressed air into the channels of said high-temperature-heat-exchanger for the second stage regeneration of the air in same, a pipe connecting said high-pressure cylinder with said low-pressure cylinder to lead the exhaust gases discharged through said channels of said high-temperature-heat-exchanger into said low-pressure cylinder for further expansion therein without internal combustion, and a line connecting said low-pressure cylinder with said low-temperature-heat-exchanger for the introduction of said exhaust gases into said low-temperature-heat-exchanger.

5. A plant as claimed in claim 4, a power-generating engine arranged in said plant, and a line connecting said low-temperature-heat-exchanger with said power-generating engine for conducting the exhaust gases into said power-generating engine for being expanded therein to atmospheric pressure.

MICHAEL MARTINKA.